United States Patent
Bliss et al.

[19]

[11] Patent Number: 6,147,685
[45] Date of Patent: Nov. 14, 2000

[54] SYSTEM AND METHOD FOR EDITING GROUP INFORMATION

[75] Inventors: William J. Bliss, Woodenville; Silvana Y. Rimoli, Redmond, both of Wash.

[73] Assignee: Microsoft Corporation, Redmond, Wash.

[21] Appl. No.: 09/219,078

[22] Filed: Dec. 22, 1998

Related U.S. Application Data

[62] Division of application No. 08/792,622, Jan. 31, 1997, Pat. No. 5,884,306.

[51] Int. Cl.⁷ ..................................................... G06F 15/00
[52] U.S. Cl. ............................................. 345/347; 345/353
[58] Field of Search ..................................... 345/326–358, 345/145–146, 352–353, 356–357

[56] References Cited

U.S. PATENT DOCUMENTS

| | | | |
|---|---|---|---|
| 5,065,347 | 11/1991 | Pajak et al. ............................... | 345/348 |
| 5,157,763 | 10/1992 | Peters et al. ............................. | 345/340 |
| 5,317,686 | 5/1994 | Salas et al. ............................... | 707/503 |
| 5,428,734 | 6/1995 | Haynes et al. ........................... | 345/348 |
| 5,428,776 | 6/1995 | Rothfield .................................. | 345/968 |
| 5,485,567 | 1/1996 | Banning et al. .......................... | 345/348 |
| 5,546,526 | 8/1996 | Li et al. .................................... | 345/968 |
| 5,553,218 | 9/1996 | Li et al. .................................... | 345/348 |
| 5,638,505 | 6/1997 | Hemenway et al. ..................... | 345/348 |
| 5,696,915 | 12/1997 | Johnston, Jr. et al. .................. | 345/335 |
| 5,706,454 | 1/1998 | MacPhail .................................. | 345/348 |
| 5,721,900 | 2/1998 | Banning et al. .......................... | 345/968 |
| 5,724,532 | 3/1998 | Thomson .................................. | 345/346 |
| 5,745,891 | 4/1998 | Minakuchi et al. ...................... | 345/968 |
| 5,787,418 | 7/1998 | Hibbetts et al. ............................ | 707/4 |
| 5,835,919 | 11/1998 | Stern et al. ........................... | 345/340 X |

OTHER PUBLICATIONS

Cowart, "Mastering WINDOWS 3.1", Sybex, Inc., pp. 101–142, 1993.
Staes et al., "A Graphical Query Language for Object Oriented Databases", IEEE, pp. 205–210, 1991.
Czejdo et al., Design and Implementation of an Interactive Graphical Query Interface for a Relational Database Management System, IEEE, pp. 14–20, 1988.

*Primary Examiner*—Steven Sax
*Attorney, Agent, or Firm*—Jones & Askew, LLP

[57] ABSTRACT

A system and method for grouping and editing items directly on a display screen without accessing a dialog box. A box is displayed for grouping a plurality of items. These items are comprised of various fields of information. At least one field is selected for grouping the items. After the field is selected, the field is placed onto the box. The selected field is then displayed in the box. After the field is displayed in the box, the items are grouped by the selected field. After grouping the items by the selected field, the items are displayed as grouped by the selected field. The tasks are repeated for each field remaining if nesting of groups is desired. Items can be edited directly on the display screen by selecting an item from a first field group. The item is then moved to a second field group. As the item moves to the second field group, a message is displayed indicating the status of the item if the item is placed in the second field group. The item is then placed in the second field group. As a result of placing the item in the second field group, the item and fields are updated to reflect the new grouping status.

6 Claims, 18 Drawing Sheets

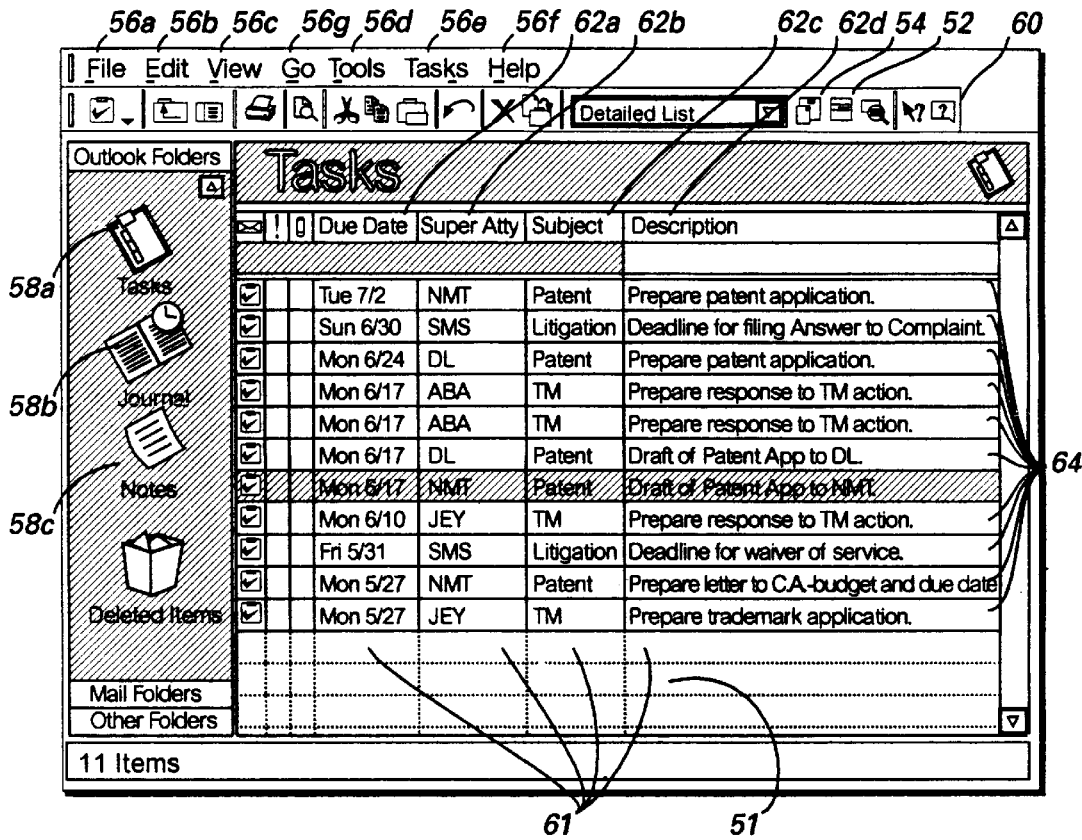

FIG.2

| REF. NO. | ELEMENT |
|---|---|
| 50 | DISPLAY SCREEN |
| 51 | PROGRAM MODULE DISPLAY AREA |
| 52 | "GROUP BY BOX" BUTTON |
| 54 | "FIELD CHOOSER" BUTTON |
| 56a | "FILE" MENU |
| 56b | "EDIT" MENU |
| 56c | "VIEW" MENU |
| 56d | "TOOLS" MENU |
| 56e | "TASKS" MENU |
| 56f | "HELP" MENU |
| 56g | "GO" MENU |
| 58a | TASK PROGRAM MODULE |
| 58b | JOURNAL PROGRAM MODULE |
| 58c | NOTES PROGRAM MODULE |
| 60 | STANDARD TOOL BAR |
| 61 | COLUMN |
| 62a | "DUE DATE" COLUMN HEADER |
| 62b | "SUPER ATTY" COLUMN HEADER |
| 62c | "SUBJECT" COLUMN HEADER |
| 62d | "DESCRIPTION" COLUMN HEADER |
| 64 | ROW |

| REF. NO. | ELEMENT |
|---|---|
| 50 | DISPLAY SCREEN |
| 51 | PROGRAM MODULE DISPLAY AREA |
| 52 | "GROUP BY BOX" BUTTON |
| 70 | GROUPING BOX |

| REF. NO. | ELEMENT |
|---|---|
| 90 | "FIELD CHOOSER" DIALOG BOX |
| 92 | LIST OF AVAILABLE FIELDS |
| 94 | "NEW FIELD" BUTTON |
| 96 | "SELECT FROM" MENU |
| 98 | "X" BUTTON |

| REF. NO. | ELEMENT |
|---|---|
| 50 | DISPLAY SCREEN |
| 110 | PATENT GROUP HEADING |
| 112 | TM GROUP HEADING |
| 114 | LITIGATION GROUP HEADING |

| REF. NO. | ELEMENT |
|---|---|
| 50 | DISPLAY SCREEN |
| 70 | GROUPING BOX |
| 160 | "SUPER ATTY" FIELD |
| 164 | SUBJECT FIELD |
| 170 | SUB-GROUPS |
| 172 | PATENT GROUP HEADING |

SYSTEM AND METHOD FOR EDITING GROUP INFORMATION

RELATED APPLICATIONS

The present application is a divisional of non-provisional patent application entitled "System and Method for Directly Manipulating Field for Grouping Items", filed on Jan. 31, 1997, U.S. application Ser. No. 08/792,622, now U.S. Pat. No. 5,884,306.

FIELD OF THE INVENTION

The present invention relates to a system and method for manipulating information, and is more particularly directed to a system and method for grouping and editing information by direct on-screen manipulation.

BACKGROUND OF THE INVENTION

Personal information manager programs have become popular software tools. These programs allow the user to manage schedules, e-mail, tasks, journals, and contacts. One such personal information manager program is the "OUTLOOK" program sold by Microsoft Corporation of Redmond, Washington. Used within the framework of the "OUTLOOK" program is the Task program module. The Task program module allows a user to track the tasks that the user is responsible for at any given time. The Task program module allows the user to create, organize, update, store, and print a list of tasks to be monitored and/or implemented by the user. These tasks are arranged in a table format that allows the user to organize each task by specific fields. Grouping tasks by specific fields allows the user to differentiate between items and to better organize data. The user may want to see how many tasks that the user has completed versus the tasks to be completed. The user may want to group items based on the dates that they are due so that the user can better manage his or her time. Changing the organization of the data, however, can be cumbersome.

Many programs that support grouping of information require the user to use a dialog box. Programs such as NOTES sold by Lotus Development Corporation/IBM, EXCHANGE CLIENTS sold by Microsoft Corporation, and LOTUS IMPROV sold by Lotus Development Corporation/IBM are limited to grouping and editing items by using a dialog box. They do not support direct on-screen manipulation of data for grouping or editing.

SCHEDULE+ 7.0 sold by Microsoft Corporation supports grouping of information, but the user must use a dialog box to change grouping arrangements. In addition, the user is able to edit items directly on the display screen by using the mouse to drag and drop an item from one field group into another field group. However, there is no feedback mechanism to indicate to the user that the item and fields have been updated.

Therefore, there is a need for a system and method that support direct manipulation of data on the computer display screen. In addition, there is a need for a system and method that allow a user access to editing and grouping tools without having to perform the intermediary step of accessing a dialog box. Finally, there is a need for a system and method that are capable of providing feedback as items are edited.

SUMMARY OF THE INVENTION

The present invention satisfies the above-described needs by providing a system and method for grouping and editing items directly on a display screen without accessing a dialog box or using a keyboard. In connection with the present invention, the first step is to display a box for grouping a plurality of items. These items consist of various fields of information. The next step is to select at least one field for grouping the items. After the field is selected, the field is placed onto the box. The selected field is then displayed in the box. After the field is displayed in the box, the items are grouped by the selected field.

The method of grouping the items by the selected field involves primarily three steps. The first step is to sort the items by the selected field. The items are then scanned for duplicate field groups. Once the duplicate field groups are determined, the duplicate field groups are eliminated to provide a discrete set of field groups.

After grouping the items by the selected field, the next step is to display the items as grouped by the selected field. The steps are repeated for each field remaining if nesting of groups is desired.

In addition to the grouping aspect of the invention, items can be edited directly on the display screen as well, without accessing the dialog box or using a keyboard. To edit an item, the first step is to select an item from a first field group. In the next step, the item is moved to a second field group. As the item moves to the second field group, a message is displayed indicating the status of the item if the item is placed in the second field group. The item is then placed in the second field group. As a result of placing the item in the second field group, the item and fields are updated to reflect the new grouping status.

In view of the foregoing, the present invention provides an improved system and method for grouping and editing information. The system and method allow direct manipulation of information without the use of a dialog box or keyboard. The system and method also provide a feedback mechanism for informing a user of the changes that will occur as an item changes fields.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 2 is a screen display illustrating an initial display screen in accordance with the preferred embodiment of the present invention.

DETAILED DESCRIPTION OF THE PREFERRED EMBODIMENT

Figure 1:
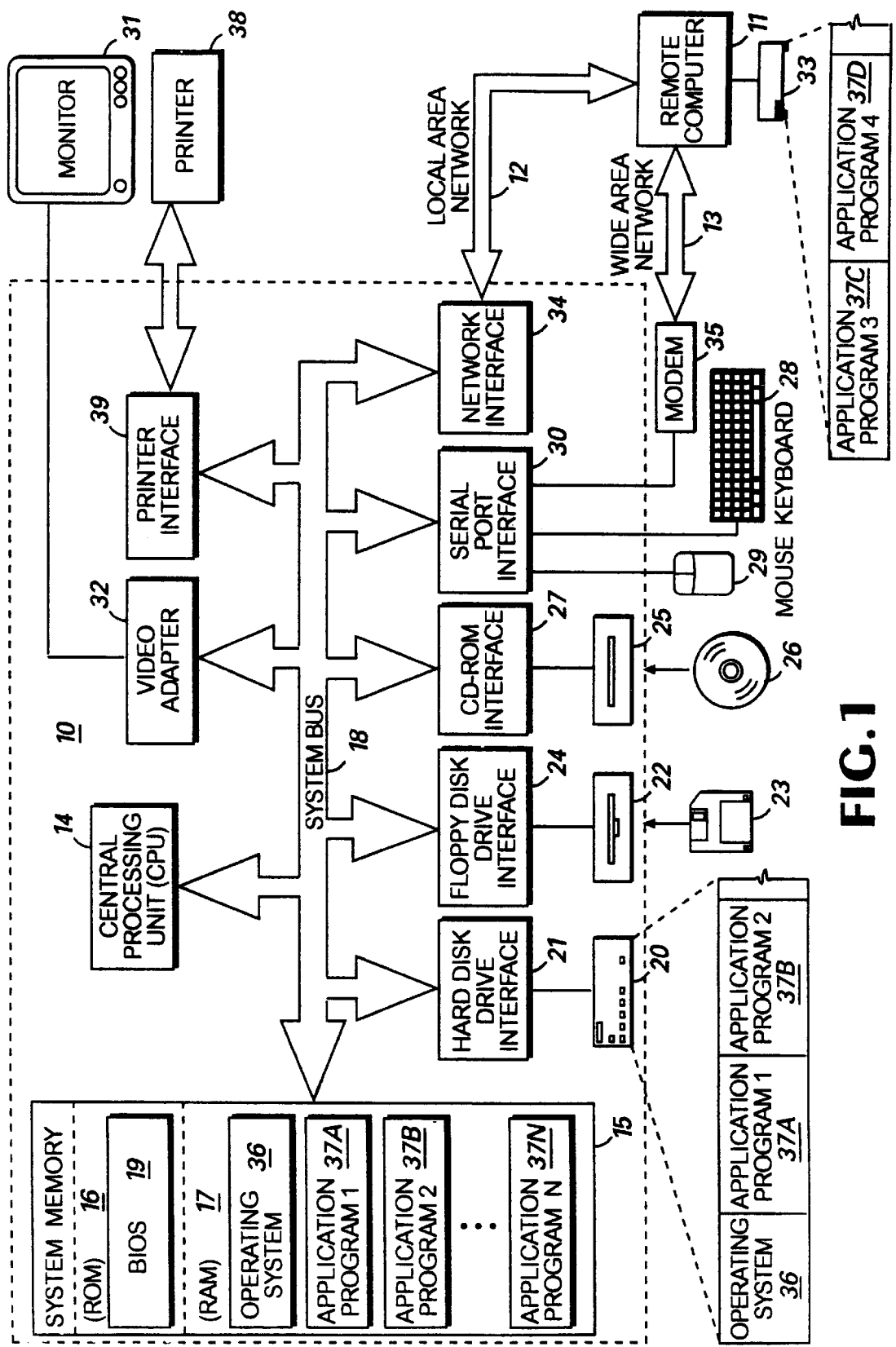
FIG. 1 is a block diagram of a personal computer that provides the operating environment for the preferred embodiment of the present invention.

The present invention is directed to a system and method for grouping and editing information by direct on-screen manipulation. The preferred environment of the present invention is represented by "OUTLOOK" application program, which is sold by Microsoft Corporation of Redmond, Washington. Briefly described, the preferred program allows a user to manage the user's own calendar, tasks, notes, and contacts, as well as share and exchange this information with others. The present invention provides a computer-implemented process, called Direct Manipulation Group By, for grouping and editing information by direct on-screen manipulation, and is used within the framework of the "OUTLOOK" program. The direct manipulation "group by" feature has a user interface to communicate to the user the events that are taking place on a display screen as items are being manipulated. Particularly, the user interface allows the user direct access to grouping and editing functions from the display screen instead of requiring the user to access a dialog box or use a keyboard to perform the same functions.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices, display devices, and input devices. Furthermore, these processes and operations may utilize conventional computer components in a heterogeneous distributed computing environment, including remote file servers, compute servers, and memory storage devices. Each of these distributed computing components is accessible by the PU via a communication network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process or method is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as selecting, converting, adding, comparing, calculating, moving, positioning, placing, altering, printing, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

As shown in FIG. 1, a personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit (PU) 14, such as the 80486 or "PENTIUM" microprocessor manufactured by Intel Corporation of Santa Clara, Calif. It will be understood that the computer 10 can include other PU models, such as a member of the MIPS family by Silicon Graphics, Inc. or a Power PC processor by Motorola Corporation. The personal computer also includes system memory 15 (including read only memory (ROM) 16 and random access memory (RAM) 17), which is connected to the PU 14 by a system bus 18. The BIOS 19 for the personal computer 10 is stored in ROM 16. Those skilled in the art will recognize that the BIOS 19 is a set of basic routines that helps to transfer information between elements within the preferred personal computer 10. Although the preferred computer 10 includes a ROM-based BIOS, those skilled in the art will appreciate that the computer 10 can be implemented by other computer models, such as the Apple "Macintosh" series or a SUN workstation.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, head-trackers, data gloves, pens, and other devices suitable for positioning a cursor on a computer monitor 31. The monitor 31 or other kind of display device is connected to the system bus 18 via a video adapter 32. A printer 38 is connected to the system bus 18 via a printer interface 39.

The remote computer 11 in the illustrated networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37a–37n, and data are provided to the personal computer 10 via one of the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is typically used to store data and programs, including the operating system and programs.

When the personal computer 10 is turned on or reset, the Basic Input/Output System (BIOS) 19, which is stored in the ROM 16, instructs the PU 14 to load the operating system 36 from the hard disk drive 20 into the RAM 17. Once the operating system 36 is loaded into RAM 17, the PU 14 executes the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user. For example, when the user wants to load the application program 37a, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37a is loaded into the RAM 17, it is executed by the PU 14. In case of large programs, the PU 14 loads various portions of program modules into RAM 17 as needed.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 or printing text on the attached printer 38. Generally described, the application program 37a communicates with the operating system 36 by calling predefined functions provided by the operating system 36. The operating system 36 responds by providing the requested information in a message or by executing the requested task.

With continuing reference to FIG. 1 and now turning to FIGS. 2–16, the user's environment for the preferred embodiment of the present invention will be described by utilizing screen displays generated by the preferred application program. FIGS. 2–16 illustrate the screen displays provided by the preferred presentation program module 37a to allow the user to group and edit items by direct manipulation of the items as viewed on the display screen.

FIG. 2 depicts an initial display screen 50 that is displayed on the monitor 31. The display screen 50 includes a program module display area 51 in which is displayed a series of icons representing program modules 58a–c, a series of general operational choice menus 56a–g, and a standard tool bar 60. The display screen 50 is displayed by the application program 37a, which is stored in the system memory 15 of the computer 10.

Because the present invention focuses on one aspect of the preferred application program 37a, the direct manipulation "group by" feature, primary focus will be placed on the general operational menus, namely the "File" menu 56a and the "View" menu 56c, a "Group By Box" button 52 located on the standard tool bar 60, and a "Field Chooser" button 54 located on the standard tool bar 60, which are the main functions used in the preferred embodiment of the present invention.

The "File" menu 54a may be used to open existing files stored in one of the computer's memory storage devices, open new files so that the user may create a set of tasks or make a new schedule, save new information, or print information selected by the user. The "View" menu 56c allows the user to view information in special formats as well as to perform special functions, including grouping information, sorting information, adding new fields, and displaying available fields. Of particular interest is the use of the "Group By Box" option and the "Field Chooser" option under the "View" menu and the "Group By Box" button 52 and the "Field Chooser" button 54 located near the right end of the standard tool bar 60 for reasons to be described below.

With continuing reference to FIG. 2, the Task program module 58a is selected to demonstrate implementation of the present invention. Those skilled in the art will appreciate that the present invention is not limited to the above-mentioned program module for implementation of the direct manipulation "group by" feature. The Task program module 58a is a personal information manager that allows the user to track the tasks that the user is responsible for at any given time. The Task program module 58a allows the user to create, organize, update, store, and print a list of tasks to be monitored and/or implemented by the user. These tasks are arranged in a format that allows the user to organize each task by specific fields.

In FIG. 2, the tasks are shown in a table format, which consists of columns 61 and rows 64 located in the program module display area 51 of the display screen 50. Each column 61 represents a specific field, and each row 64 represents an item. The user may either open an existing task list by using the "File" menu 56a or the user may create a new task list as described below.

To create a task list, the user first selects fields that are appropriate for inputting the corresponding segment of each item. The user can select preset fields or can create new fields. These fields, which are represented by corresponding column headers 62a–d, may include, by way of example, a due date field, a supervising attorney field, a subject field, and a description of the task field. Other fields may also be specified by the user. The user then chooses which fields to display in the program module display area 51 of the display screen 50. For this example, the user selects the due date field, the supervising attorney field, the subject field, and the description of the task field to display in the program module display area 51 of the display screen 50. As shown in FIG. 2, the respective column headers 62a–d for each of these selected fields are located at the top of each column 61.

Once the fields are selected, the user can then arrange the items to be completed by inputting the information for each item under the appropriate field. The user can also provide information under the fields that are not shown in the program module display area 51 of the display screen 50. Any field, whether or not viewed on-screen, can be retrieved when necessary using the functions supported by the Task program module 58a.

In FIG. 2, the task list is selected by one of the methods described above, either creating a new task list or opening an existing task list. After creating or selecting the task list, the user may find it beneficial to group the information based on the values of specified fields as described below.

Figure 3:
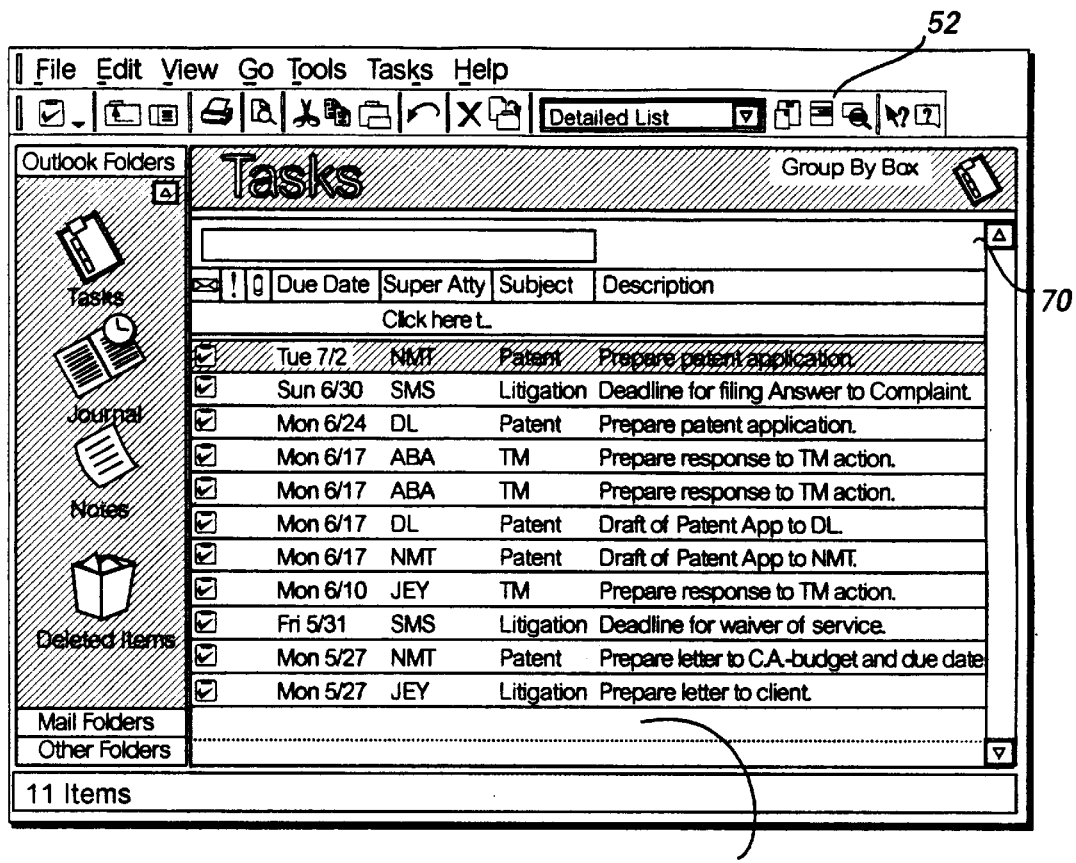
FIG. 3 is a screen display illustrating a selection of a "Group By Box" button in connection with displaying a grouping box in accordance with the preferred embodiment of the present invention.

FIG. 3 depicts a screen display with the Group By Box button 52 selected. The user selects the Group By Box button 52 by clicking onto the button using the mouse 29. When the Group By Box button 52 is selected, a grouping box 70 appears at the top of the program module display area 51 of the display screen 50. This grouping box 70 serves as an area where column headers can be dragged and dropped using the mouse 29 to group the task list according to the respective field. The process for selecting a field for grouping the task list will be described in greater detail below with respect to FIGS. 2, 4, 5 and 6.

Figure 4:
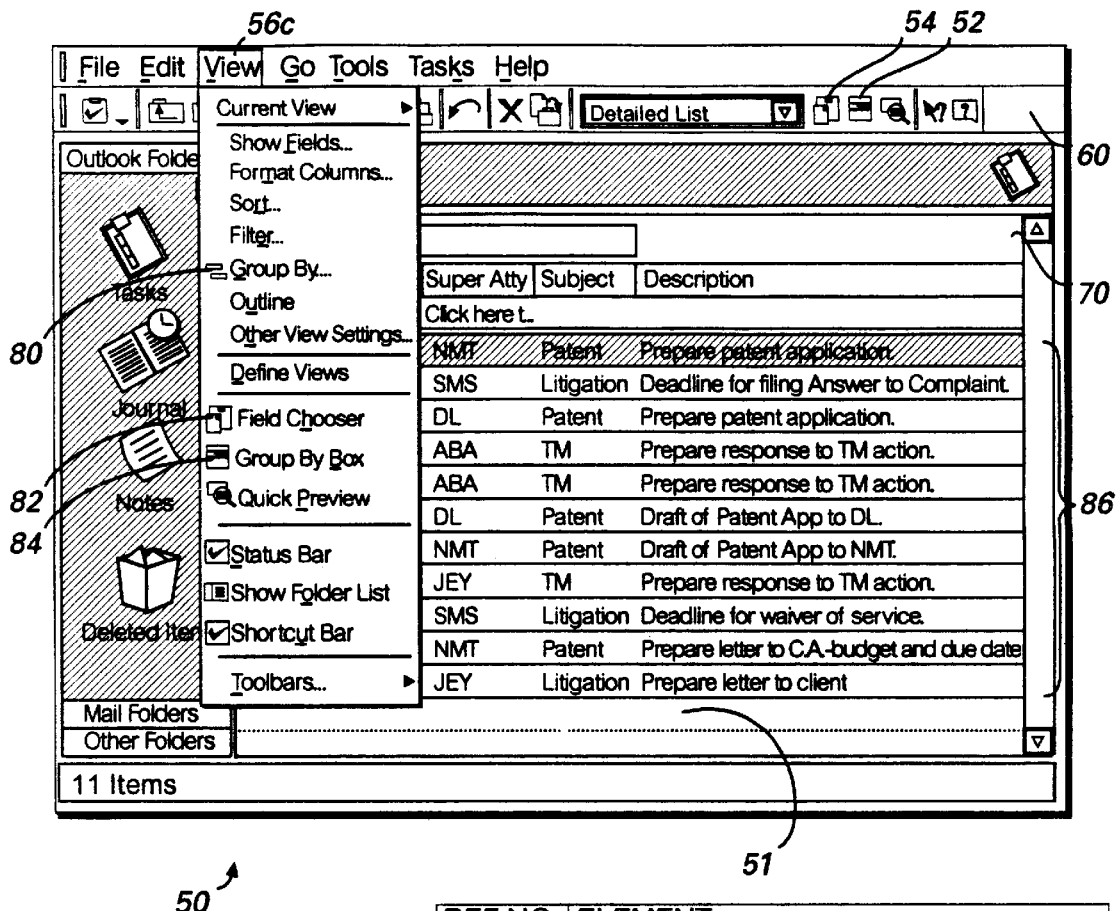
FIG. 4 is a screen display illustrating of use of a "View" menu in accordance with the preferred embodiment of the present invention.

Another avenue by which the user can display the grouping box is illustrated in FIG. 4. FIG. 4 depicts a screen display with the "View" menu selected. The user selects the "View" menu 56c by clicking onto the word "View" using the mouse 29. The user then moves down to a Group By Box option 84 located in the "View" menu 56c using the mouse 29. The user then clicks on the Group By Box option 84. After selecting the Group By Box option 84, the grouping box 70 appears at the top of the program module display area 51 of the display screen 50. Once the user has selected the Group By Box button 52 (FIG. 3 and 4) or the Group By Box option 84 under the "View" menu 56c (FIG. 4) to display the grouping box 70, the user then selects the desired field or fields for grouping the items 86 that make up the task list.

Figure 6:
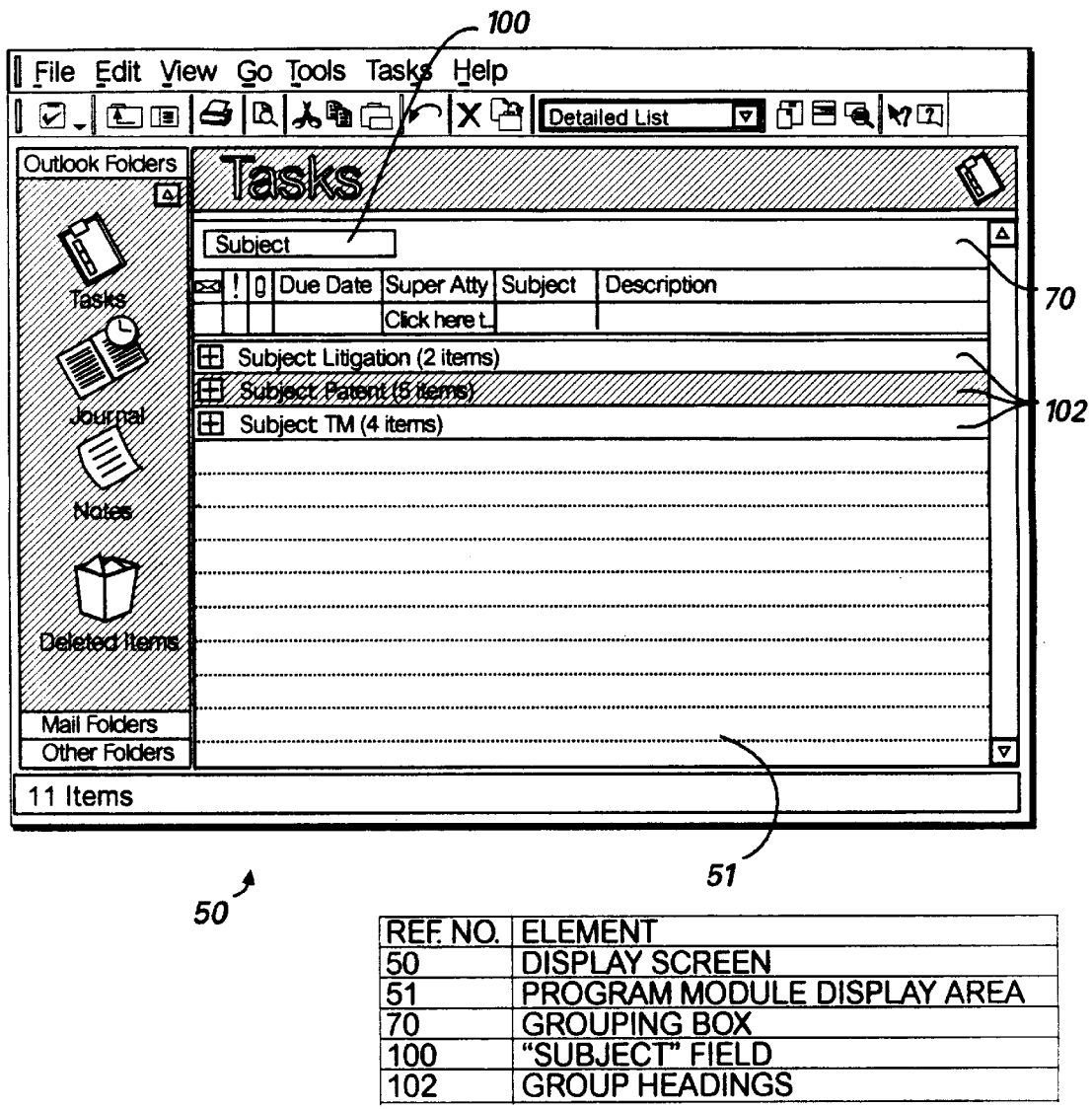
FIG. 6 is a screen display illustrating the grouping of information based on selection of a specific field in accordance with the preferred embodiment of the present invention.

If the desired field for grouping is currently displayed as one of the column headers 62a–d located at the top of each column 61 (FIG. 2), the user simply selects the desired column header, for example the column header 62c labeled "subject", by using the mouse 29. The user clicks the mouse 29 on the column header 62c and holds the mouse button down in the clicked position to select the column header 62c. The user then drags the column header 62c using the mouse 29 onto the grouping box 70 and releases the mouse button, thereby dropping the column header 64c onto the grouping box 70, as shown in FIG. 6. Before releasing the mouse button to drop the column header 64c, a pair of arrows (not shown) appears in the grouping box 70 to indicate that the column header 64c can be dropped onto the grouping box 70.

However, if the desired field for grouping is not currently displayed as one of the column headers 62a–d located at the top of each column 61 (FIG. 2) on the display screen 50 of the monitor 31, the user then selects the Field Chooser button 54 located on the standard tool bar 60 (FIG. 4) or selects a Field Chooser option 82 under the "View" menu 56c (FIG. 4) using the mouse 29 to obtain a list of the fields of the item currently not shown on the display screen 50. Once the user selects the Field Chooser button 54 or the Field Chooser option 82, a Field Chooser dialog box 90, as shown in FIG. 5, appears on the program module display area 51 of the display screen 50.

Now turning to FIG. 5, the Field Chooser dialog box 90 will be described in greater detail. The Field Chooser dialog box 90 includes a list of available fields 92, a "Select From" menu 96, and a "New Field" button 94. The "New Field" button 94 located at the bottom of the Field Chooser dialog box 90 allows the user to create fields if the field is not already present in the list of available fields 92. The "Select From" menu 96 allows the user to choose between displaying all task fields or displaying task fields created by the user. However, for the purpose of the present invention, a primary function of the Field Chooser dialog box 90 is selection of a field that is not already displayed as a column header on the display screen for grouping information.

Figure 5:
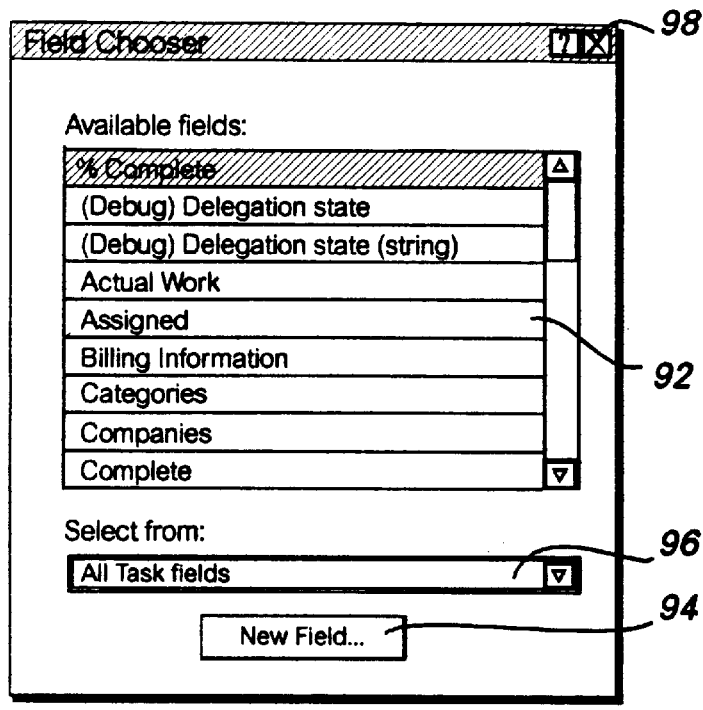
FIG. 5 is a screen display illustrating a "Field Chooser" dialog box in accordance with the preferred embodiment of the present invention.

In FIG. 5, the user can select from the list of available fields 92, represented by field headings, by using the mouse 29. The user simply clicks the mouse 29 on the desired field heading, holds the mouse button down in the clicked position to select the desired field, and drags the field heading using the mouse 29 onto the grouping box 70 (FIG. 6). A pair of arrows (not shown) appears in the grouping box 70 to indicate that the field heading can be dropped onto the grouping box 70. The user then releases the mouse button to drop the field heading onto the grouping box 70. Once the user has selected the desired field or fields from the Field Chooser dialog box 90, the user selects an "x" button 98 located at the top right-hand corner of the Field Chooser dialog box 90 by clicking the "x" button 98 using the mouse 29 to close the dialog box 90.

Now turning to FIG. 6, a screen display depicts the grouping of information based on a selection of a specific field. A grouping of items, indicated by group headings 102, as depicted on the program module display area 51 of the display screen 50 is an example of one way the items 86 of FIG. 4 can be grouped. In the simplest example of grouping, the user selects the "subject" field 100 for grouping items. One of ordinary skill in the art will understand that selection of the "subject" field is not the only field available for grouping. Furthermore, the direct manipulation "group by" feature can support more complex grouping arrangements, whereby fields are nested within fields by simply selecting more than one field heading to drop onto the grouping box. This concept of nesting fields will be described in greater detail with respect to FIGS. 12–15.

After the user selects, drags, and drops the "subject" column header onto the grouping box 70 using the mouse 29, as previously described, items are automatically grouped in a collapsed view as depicted in FIG. 6. The grouped items can be ungrouped by clicking onto the header in the grouping box 70 using the mouse 29 and dragging the header out of the grouping box 70. In FIG. 6, the group headings 102 indicate that the items are grouped by subject and that the subjects are Litigation, comprising two items, Patent, comprising five items, and TM (trademark), comprising four items. To display the actual items listed under each subject, the fields must be converted to an expanded view as shown in FIG. 7.

Figure 7:
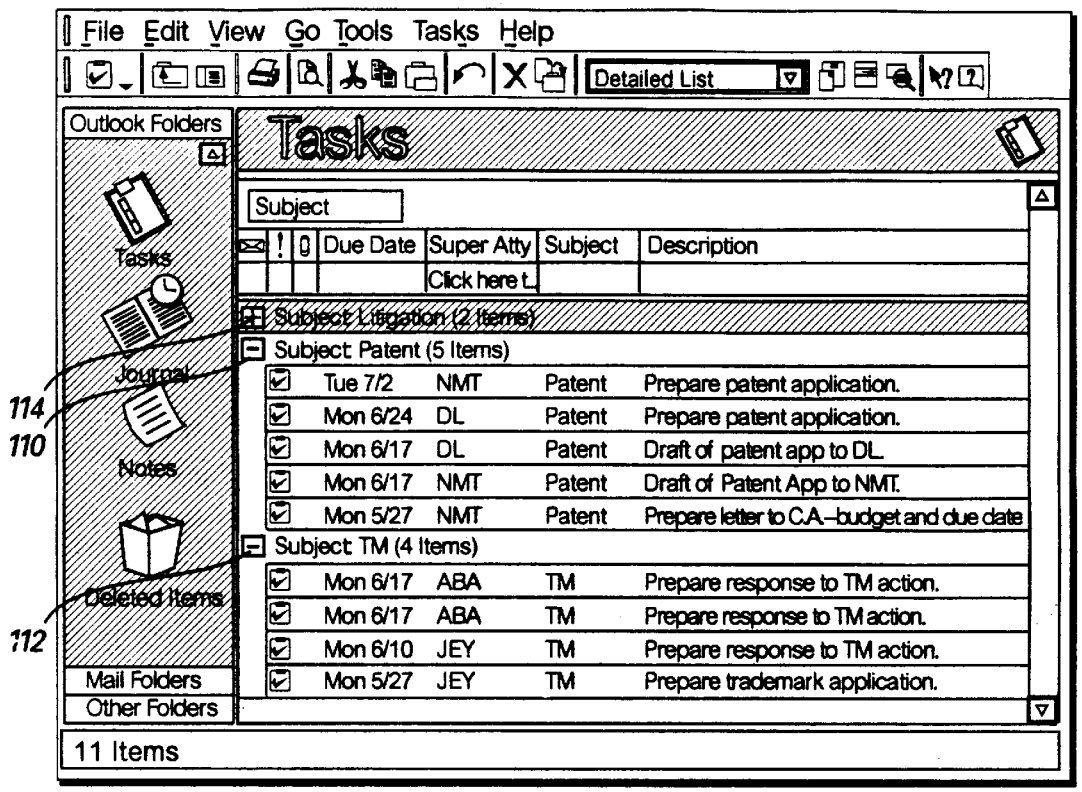
FIG. 7 is a screen display illustrating subject groupings in an expanded view in accordance with the preferred embodiment of the present invention.

FIG. 7 is a screen display illustrating subject groupings in an expanded view, whereby the respective items for each subject can be viewed on the display screen. To display the items listed under each subject in the expanded view, the user moves the mouse 29 to any of the group headings 110, 112, and 114 that the user would like to display in the expanded view. The user then clicks the mouse 29 one time on the selected group heading. Once the group heading is selected, the field automatically converts to the expanded view. To return to the collapsed view, the user need only click the mouse 29 a second time on the selected group heading.

In FIG. 7, for example, the user wants to display the items under the group headings 110 and 112 on the display screen 50. To do so, the user clicks the mouse 29 one time on the respective group heading. As a result, the five items under the Patent group heading 110 are now displayed on the display screen 50, and the four items under the TM group heading 112 are now displayed on the display screen 50.

A grouping arrangement may be changed at any time by dragging a column header out of the grouping box 70 and dragging another column header onto the grouping box 70 using the mouse 29. As a result, the newly desired field replaces the old field, and the grouping arrangement is automatically updated.

At this stage, the focus of the discussion will now turn to on-screen editing of grouped items utilizing the example task list of FIGS. 2–4, 6 and 7. The present invention allows the user to perform editing of an item directly on the display screen using a mouse by dragging and dropping an item in a desired group. When the item is dragged and dropped into another group, the appropriate field or fields will be updated on the item to reflect the new grouping. As the item is dragged to the new group, a tooltip banner appears on the display screen to indicate the field change or changes that will occur as a result of dropping the item in the new group.

Figure 8:
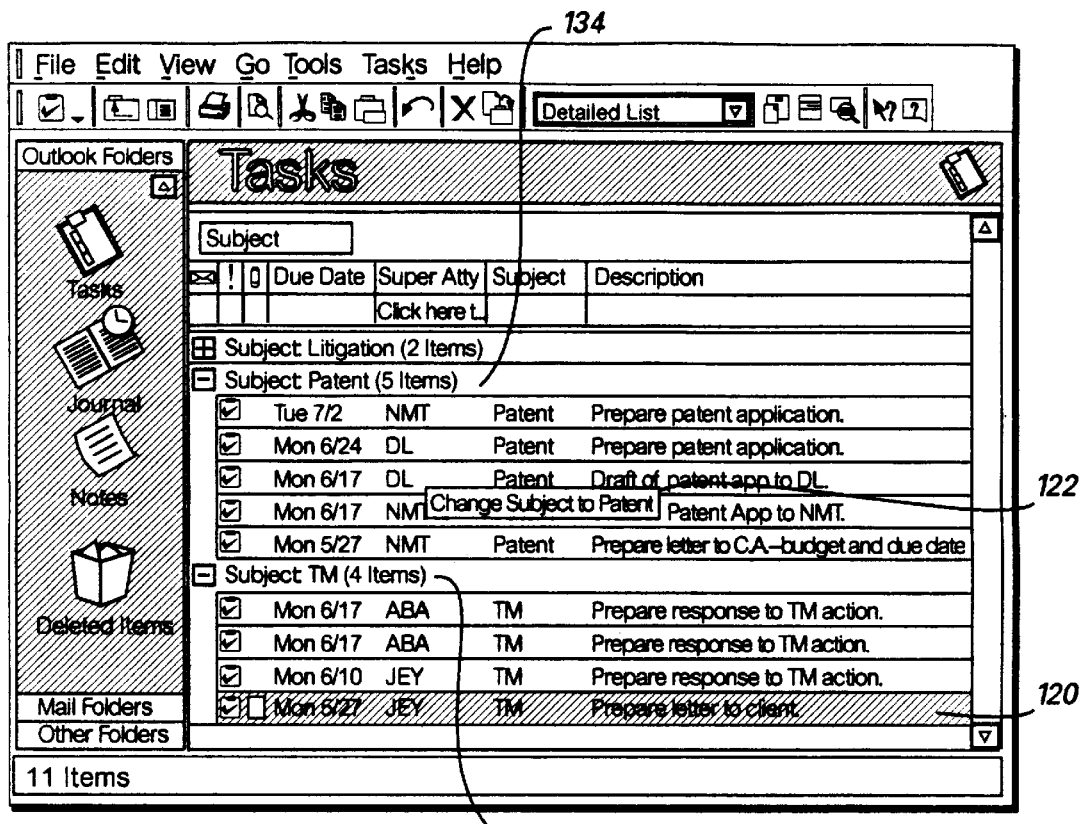
FIG. 8 is a screen display illustrating selection of an item for on-screen editing in accordance with the preferred embodiment of the present invention.
Figure 9:
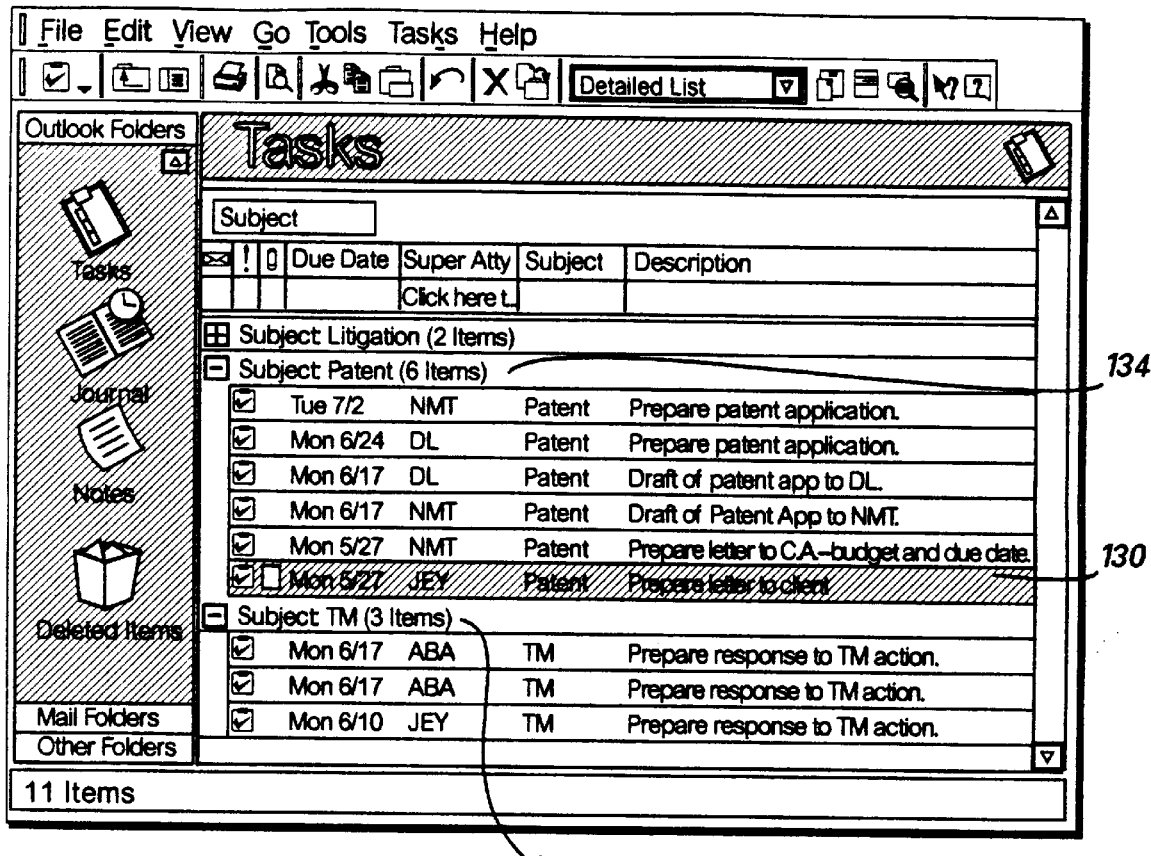
FIG. 9 is a screen display illustrating the results of moving an item from one field group to another field group in accordance with the preferred embodiment of the present invention.

Referring to FIGS. 8–11, the on-screen editing process for grouped items will now be described. However, the editing process for nested fields will be described later with respect to FIG. 16. Turning first to FIG. 8, a screen display depicts a selection of an item for on-screen editing in accordance with the preferred embodiment of the present invention. In this first example, the user desires to change the subject field of an item 120 to another subject field. Both fields are in the expanded view. The current subject field of the item 120 is TM 124. If the user wants to change the subject field of item 120 to patent 134, the user can select the item 120 on the display screen 50 by clicking the mouse 29 on the item 120 and dragging the item 120 into the patent subject field 134. As the item 120 is dragged into the patent subject field 134, a tooltip banner 122 appears on the display screen 50 indicating that by dropping the item 120 in the patent subject field 134, the subject of the item 120 will be changed to patent. Specifically, the tooltip banner 122 reads "Change Subject to Patent" for the preferred embodiment of the present invention. Once the item 120 is dropped in the patent subject field 134, the item 120 is automatically updated to reflect the new field change, as shown in FIG. 9.

FIG. 9 is a screen display illustrating the results of moving an item from one field group to another field group. In FIG. 9, the item 120 of FIG. 8 changes to an item 130. The item 130 reflects the new field change to the patent subject field on the display screen 50. In addition, the group headings 132 and 134 are respectively updated to indicate a new number of items under each group heading.

Figure 10:
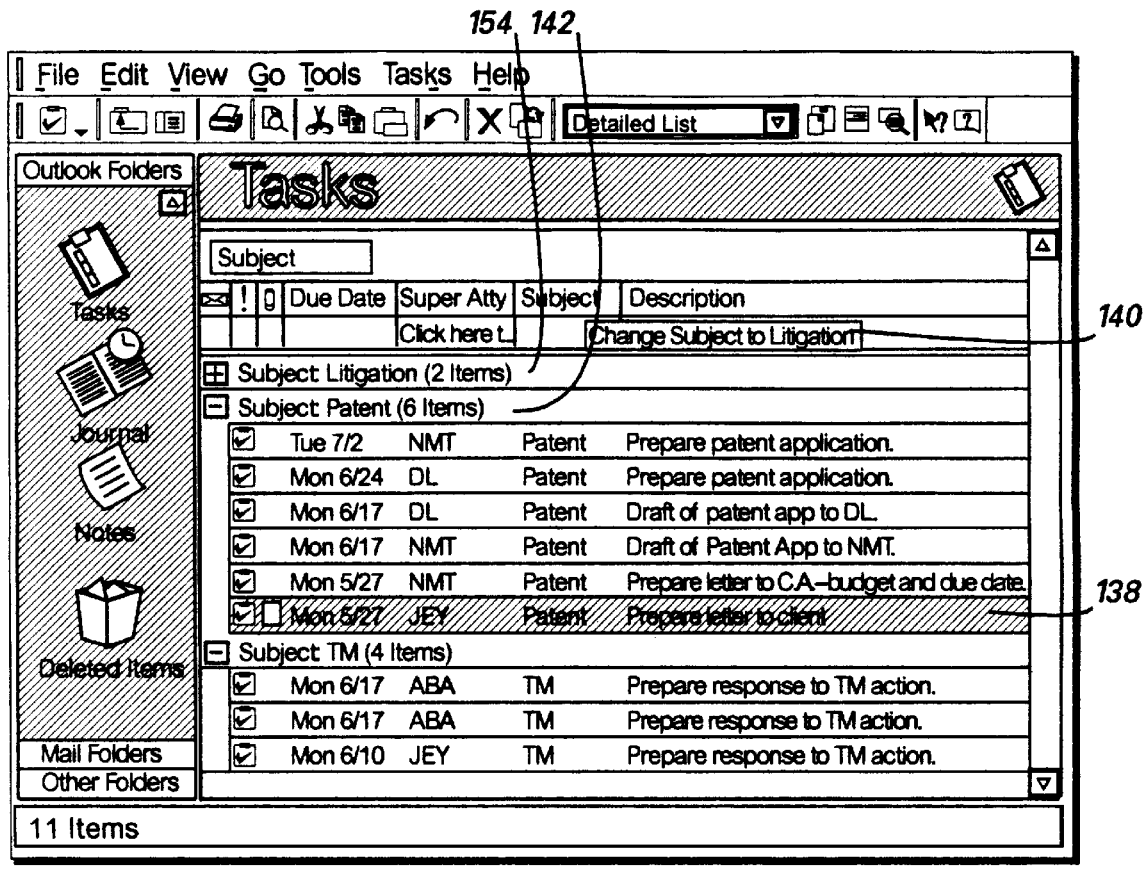
FIG. 10 is a screen display illustrating selection of an item for on-screen editing in accordance with the preferred embodiment of the present invention.

Now turning to FIG. 10, a screen display depicts a selection of an item for on-screen editing in accordance with the preferred embodiment of the present invention. In this second example, the user desires to change the subject field of an item 138 to another subject field. One field is in the expanded view while the other field is in the collapsed view. The current subject field of the item 138 is Patent 142. If the user wants to change the subject field of item 138 to litigation 154, the user can select the item 138 on the display screen 50 by clicking the mouse 29 on the item 138 and dragging the item 138 into the litigation subject field 154. As the item 138 is dragged into the litigation subject field 154, a tooltip banner 140 appears on the display screen 50 indicating that by dropping the item 138 in the litigation subject field 154, the subject of the item 138 will be changed to patent. Specifically, the tooltip banner 140 reads "Change Subject to Litigation" for the preferred embodiment of the present invention. Once the item 138 is dropped in the litigation subject field 154, the item 138 is automatically updated to reflect the new field change, as shown in FIG. 11.

Figure 11:
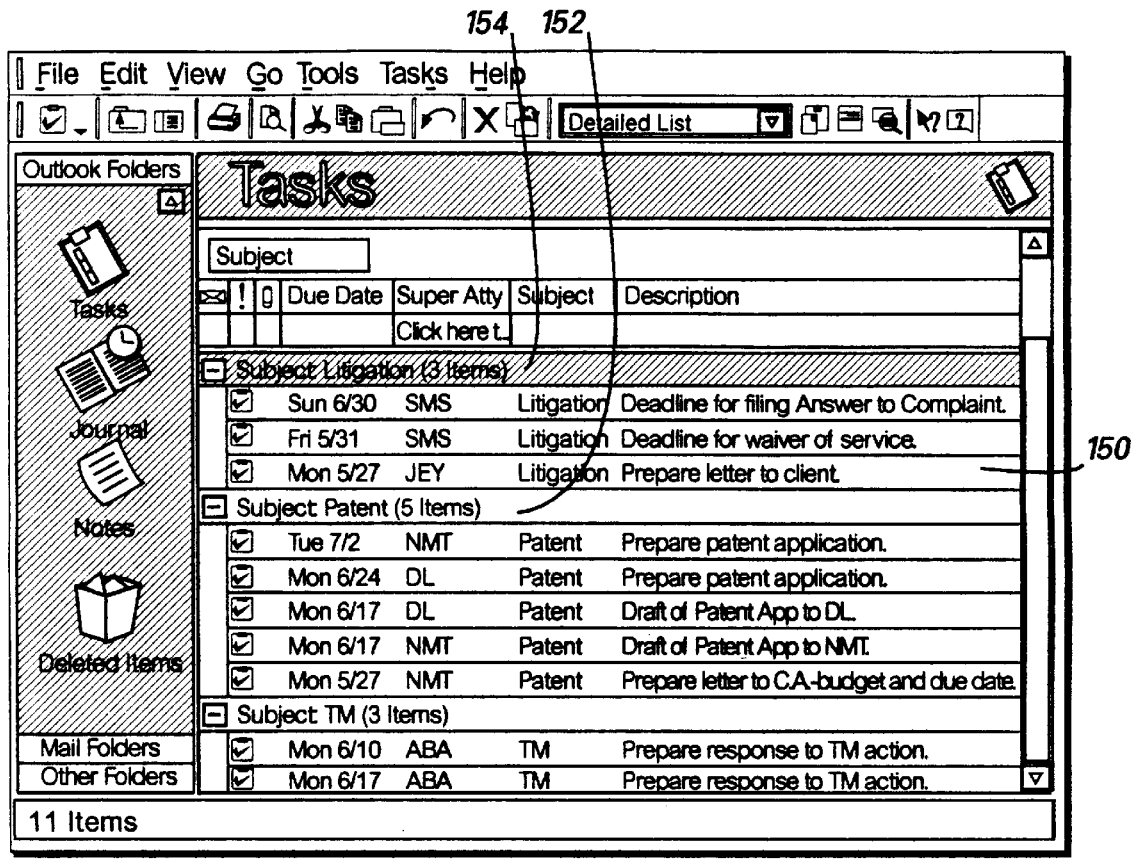
FIG. 11 is a screen display illustrating the results of moving an item from one field group to another field group in accordance with the preferred embodiment of the present invention.

FIG. 11 is a screen display illustrating the results of moving an item from one field group to another field group. In FIG. 11, the item 138 of FIG. 10 changes to an item 150. The item 150 reflects the new field change to the litigation subject field on the display screen 50. In addition, the group headings 152 and 154 are respectively updated to indicate a new number of items under each group heading.

The process for on-screen editing in the first and second examples illustrated by FIGS. 8 and 9 and FIGS. 10 and 11, respectively, is the same whether the fields are in the expanded view or the collapsed view.

Now that the basic concepts have been described with respect to FIGS. 2–11, the discussion will now turn to the concept of nesting fields which will be described in greater detail utilizing the screen displays shown in FIGS. 12 and 13. First turning to FIG. 12, a screen display depicts the selection of a second field group for nesting within a first field group. The user selects the desired second field using the same process for selecting a field described above with respect to FIGS. 4–6.

If the desired second field is represented by one of the column headers 166 on the display screen 50, the user selects the desired column header 166 by using the mouse 29. The user clicks the mouse 29 on the column header 166 and holds the mouse button down in the clicked position to select the column header 166. The user then drags the column header 166 using the mouse 29 onto the grouping box 70 near the first field and releases the mouse button, thereby dropping the column header 166 onto the grouping box 70 near the first field. Before releasing the mouse button to drop the column header 166, a pair of arrows 162 appears in the grouping box 70 to indicate that the column header 166 can be dropped onto the grouping box 70.

If the desired second field is not shown on the display screen 50, the user selects the Field Chooser button 54 located on the standard tool bar 60 (FIG. 4) or selects a Field Chooser option 82 under the "View" menu 56c (FIG. 4) using the mouse 29 to obtain a list of the fields of the item currently not shown on the display screen 50. Once the user selects the Field Chooser button 54 or the Field Chooser option 82, a Field Chooser dialog box 90, as shown in FIG. 5, appears on the program module display area 51 of the display screen 50. The user simply clicks the mouse 29 on the desired field heading, holds the mouse button down in the clicked position to select the desired field, and drags the field heading using the mouse 29 onto the grouping box 70 near the first field. The pair of arrows 162 appears in the grouping box 70 to indicate that the field heading can be dropped in the grouping box 70. The user then releases the mouse button to drop the field heading onto the grouping box 70 near the first field.

Figure 12:
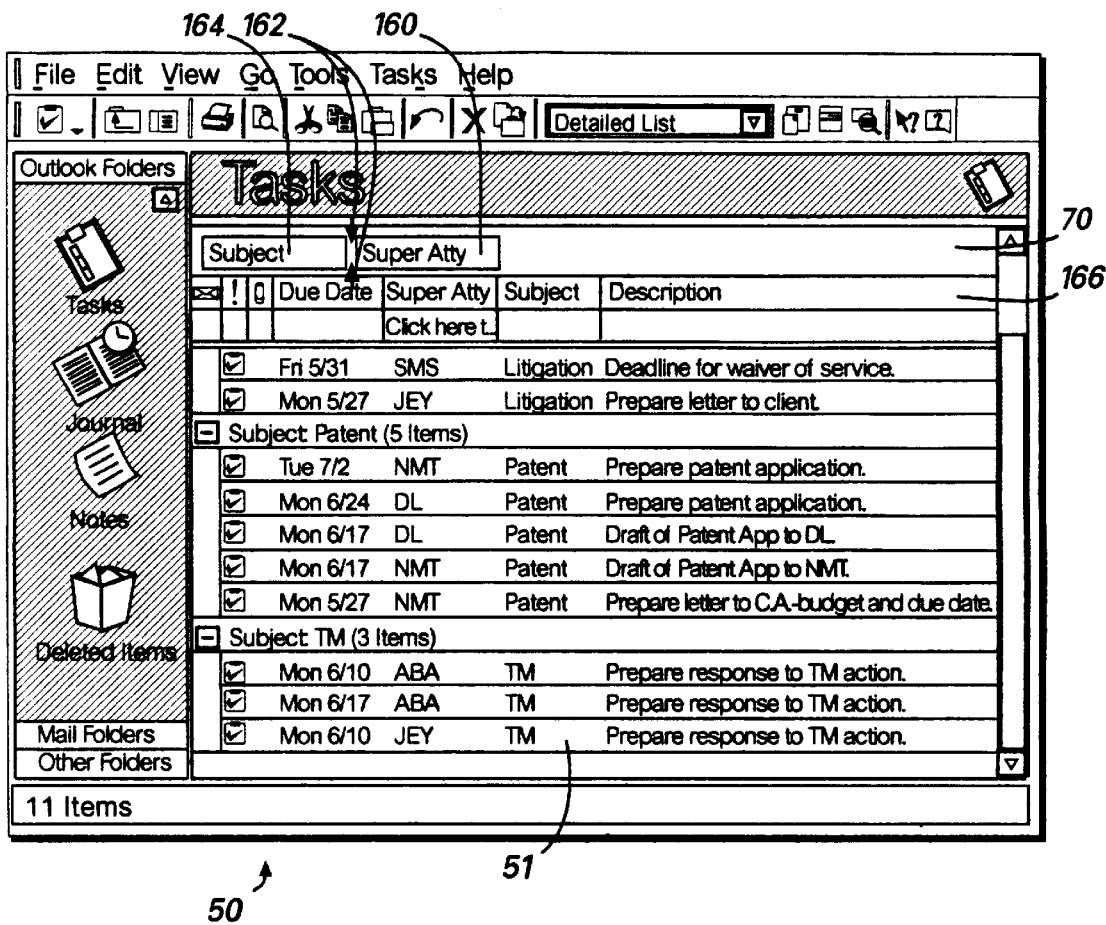
FIG. 12 is a screen display illustrating selection of a second field group for nesting within a first field group in accordance with the preferred embodiment of the present invention.

In the screen display example of FIG. 12, the user selects a supervising attorney field 160 to further organize the items already grouped by subjects 164. In other words, not only will the items be grouped according to subjects, but the subjects will each contain sub-groups organizing the items according to supervising attorneys. The user clicks the mouse 29 on the super atty field 160 and holds the mouse button down in the clicked position to select the super atty field 160. The user then drags the super atty field 160 using the mouse 29 onto the grouping box 70 near the subject field 164. A pair of arrows 162 appears in the grouping box 70 to indicate that the super atty field 160 can be dropped onto the grouping box 70. The user releases the mouse button, thereby dropping the super atty field 160 onto the grouping box 70 near the subject field 164. After dropping the super atty field 160 onto the grouping box 70, items are grouped according to subject and are further grouped according to supervising attorney under each subject, as shown in FIG. 13.

Figure 13:
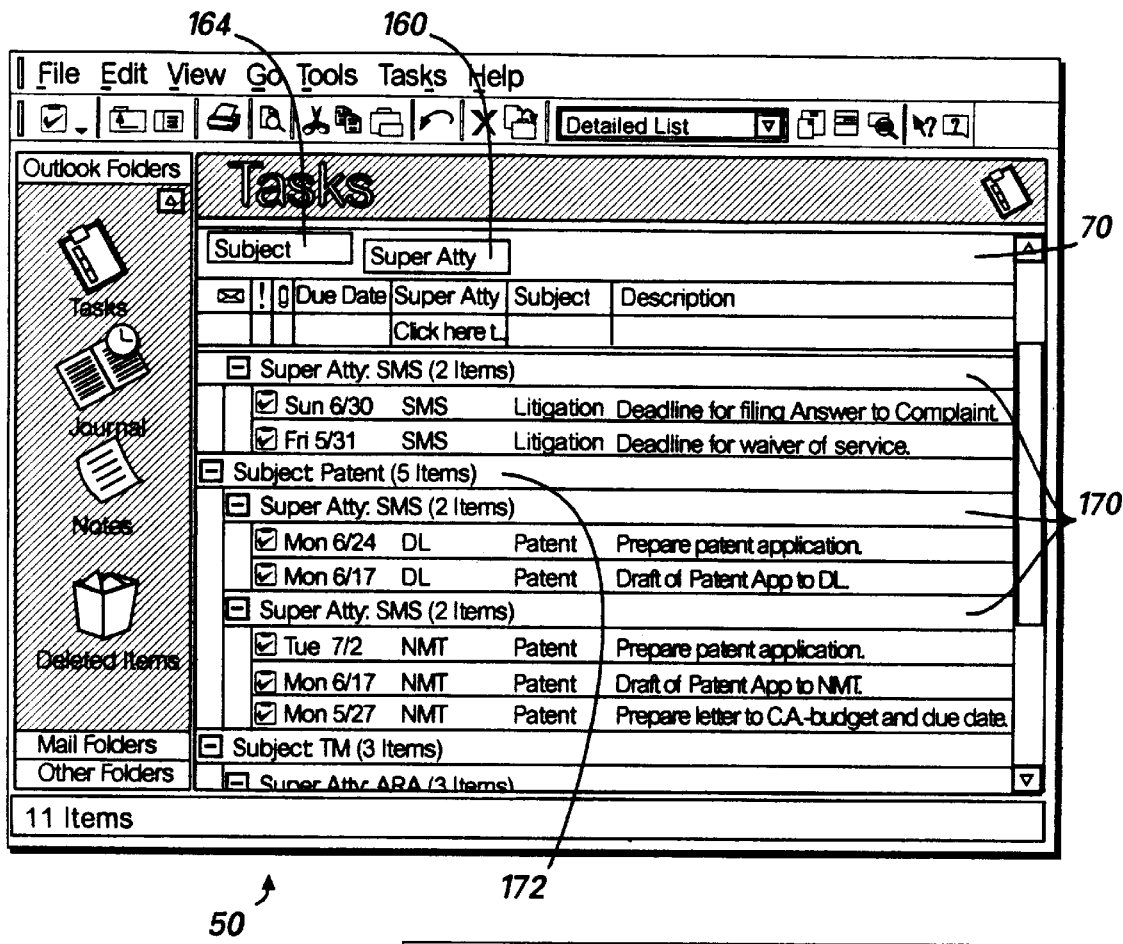
FIG. 13 is a screen display illustrating nesting of a selected field (super atty field) within a subject field in accordance with the preferred embodiment of the present invention.

Now turning to FIG. 13, a screen display depicts the nesting of a super atty field within a subject field. In the grouping box 70, the fields 160 and 164 are connected together by a line with the subject field 164 positioned slightly higher than and to the left of the super atty field 160. This arrangement indicates that the fields are nested with the subject field 164 being the main group and the super atty 160 being the sub-group. The grouping arrangement is reflected on the display screen 50. In this screen display example, a patent group 172 now comprises two sub-groups 170. These sub-groups are DL comprising two items and NMT comprising three items. The differences between the grouping of multiple fields and the grouping of one field can be clearly seen upon comparison of FIG. 7 and FIG. 13. One of ordinary skill in the art will appreciate that the fields chosen are not the only available fields for grouping and sub-grouping.

Figure 14:
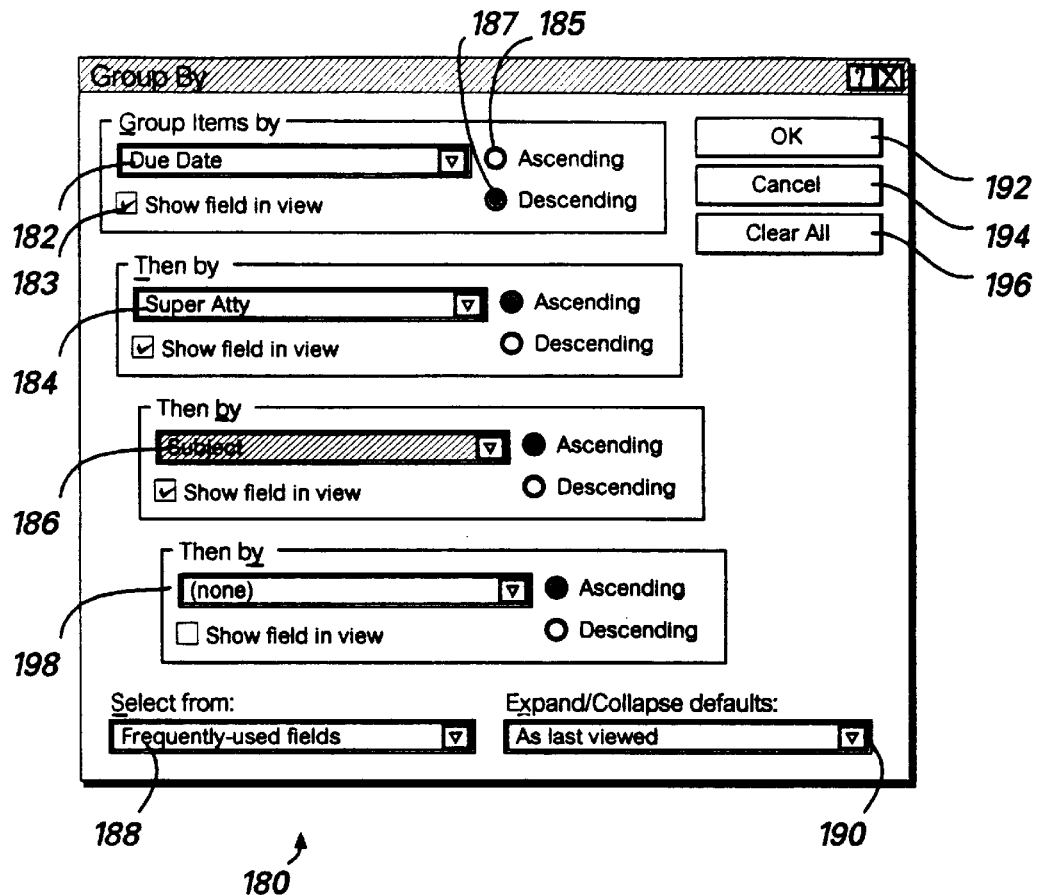
FIG. 14 is a screen display illustrating a group nesting by use of a "Group By" dialog box in accordance with the preferred embodiment of the present invention.

Now turning to FIG. 14, a screen display of a Group By dialog box is illustrated in accordance with the preferred embodiment of the present invention. The Group By dialog box 180 contains the functions for grouping items and nesting groups. To access the Group By dialog box 180, the user selects the "View" menu 56c (FIG. 4) by clicking onto the word "View" using the mouse 29. The user then moves down to a Group By option 80 (FIG. 4) located in the "View" menu 56c using the mouse 29. The user then clicks on the Group By option 80. After selecting the Group By option 80, the Group By dialog box 180 (FIG. 14) appears on the display screen 50.

Once the user has selected the Group By Box option 80 under the "View" menu 56c (FIG. 4) to display the Group By dialog box 180, the user then selects the desired field or fields for grouping items.

The Group By dialog box 180 includes field selection menus 182, 184, 186, and 198, a "Select from" menu 188, and an "Expand/Collapse defaults" menu 190. The field selection menus 182, 184, 186, and 198 allow the user to select a field from list of fields (not shown) for grouping items.

The field selection menu 182 is the main grouping menu. The field selection menus 184, 186, and 198 are sub-grouping menus. In other words, the field selected from the field selection menu 182, in this example, due date, groups all items by the due date field. The field selected from the field selection menu 184, in this example, super atty, creates a sub-group for the super atty field within the due date field. The field selected from the field selection menu 186, in this example, subject, creates a sub-group for the subject field within the sub-group super atty field. Finally, the field selected from the field selection menu 198, if any, creates a sub-group for the selected field within the sub-group subject field.

In FIG. 14, the user can select a show field in view option 183 for each field selection menu if the user wants to view the field as column header directly on the display screen. The user can also select an ascending 185 or descending 187 option for each field selection menu if the user wants to view the grouped items in either ascending or descending order, respectively. In addition, the user can select whether to view all of the fields listed, frequently-used fields or another choice of fields by selecting one of the options under the "Select from" menu 188 using the mouse 29. The user can also select whether to view the items in a collapsed view, an expanded view, or as last viewed by selecting one of the options under the "Expand/Collapse defaults" menu 190 using the mouse 29.

When the user completes making the desired selections, the user can exit the Group By dialog box 180 by selecting an "OK" button 192 to implement the selections; the user can exit the Group By dialog box 180 without implementing the selections by selecting a "Cancel" button 194; or the user can remain within the Group By dialog box 180 with the intent to change all selections, in which case the user selects a "Clear All" button.

Use of the Group By dialog box 180 is functionally equivalent to using the grouping box for grouping items as previously described with respect to FIGS. 12-13. A primary difference between use of the Group By dialog box 180 and use of the grouping box is that the former is an indirect method of grouping items by way of the dialog box, whereas the later allows the user to group, ungroup, and so forth directly on the display screen without the need for the user to access a dialog box or use a keyboard.

Figure 15:
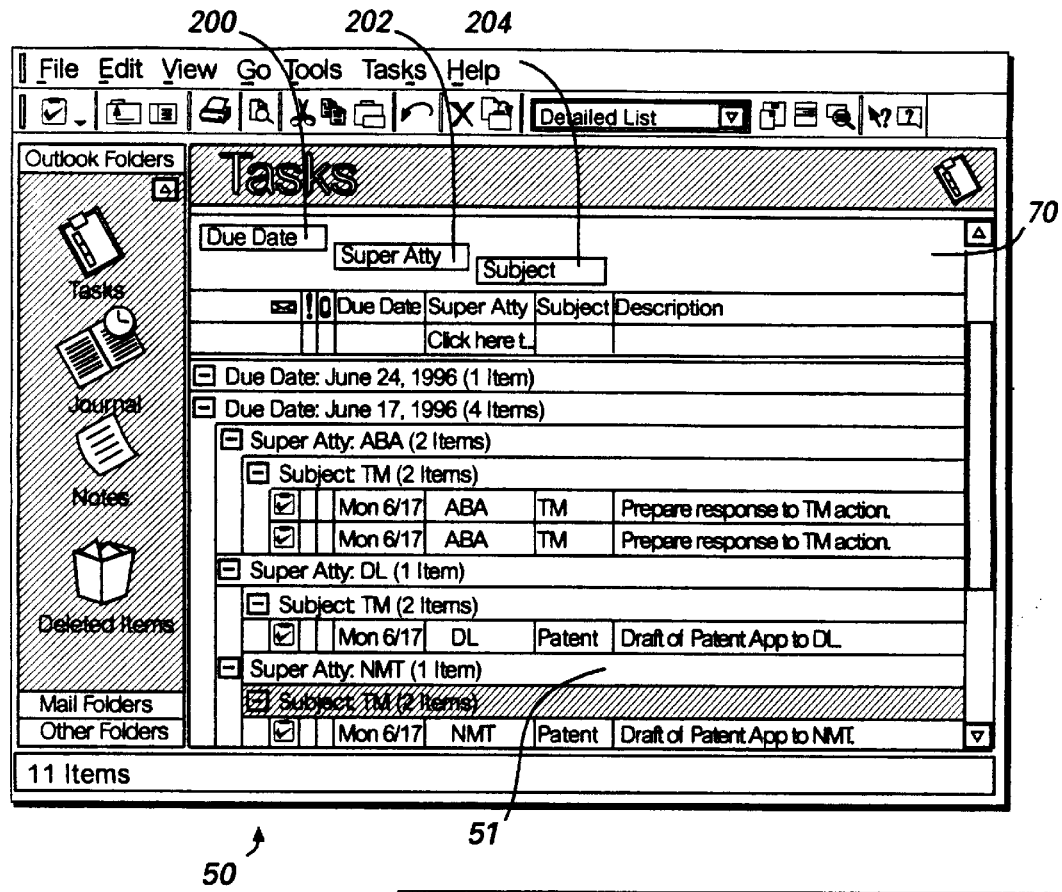
FIG. 15 is a screen display illustrating group nesting by using a grouping box instead of the Group By dialog box of FIG. 14 in accordance with the preferred embodiment of the present invention.

FIG. 15 is a screen display illustrating group nesting by using a grouping box as a functional equivalent of the selections made in the Group By dialog box of FIG. 14. In this screen display example, by utilizing the grouping box 70 and selecting the fields for grouping items using the mouse 29 as previously described, fields can be grouped directly on the program module display area 51 of the display screen 50 to produce the same grouping arrangement selected in the Group By dialog box 180 (FIG. 14). As a result of employing either mechanism for grouping items, a subject field 204 is nested within a super atty field 202, and the super atty field 202 is nested within a due date field 200. The grouping arrangement is automatically implemented and displayed on the display screen 50, as shown in FIG. 15.

Figure 16:
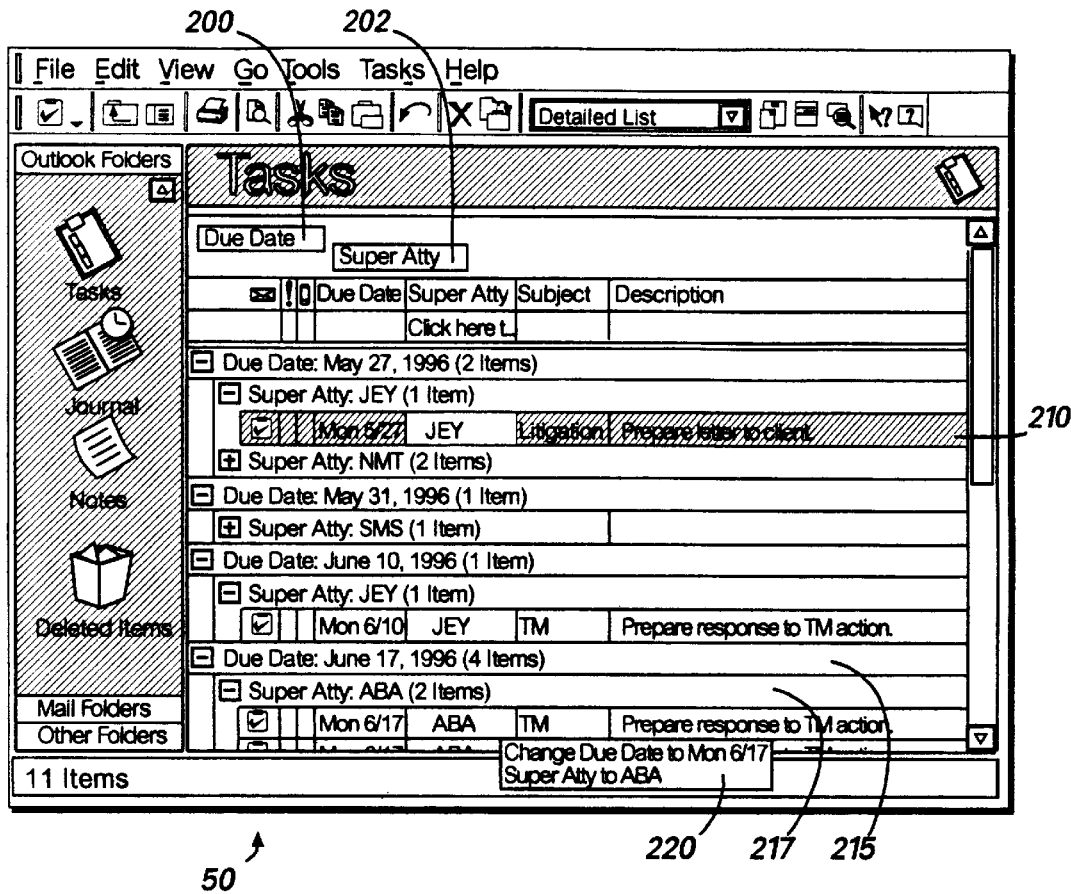
FIG. 16 is a screen display illustrating selection of an item for on-screen editing when fields are nested in accordance with the preferred embodiment of the present invention.

Now turning to FIG. 16, a screen display depicts a selection of an item for on-screen editing when fields are nested in accordance with the preferred embodiment of the present invention. In this example, the super atty field 202 is nested within the due date field 200. The user desires to edit an item 210 by not only changing the due date, but by also changing the supervising attorney. Specifically, the user desires to change the due date from May 27, 1996 to Jun. 17, 1996 and the supervising attorney from JEY to ABA. To do so, the user can select the item 210 on the display screen 50 by clicking the mouse 29 on the item 210 and dragging the item 210 beyond the due date field 215 and into the super atty field 217. As the item 210 is dragged into the super atty field 217, a tooltip banner 220 appears on the display screen 50 indicating that by dropping the item 210 in the super atty field 217, not only will the supervising attorney JEY change to ABA, but the due date will also change to Jun. 17, 1996. Specifically, the tooltip banner 220 reads "Change Due Date to Mon June 17, Super Atty to ABA" for the preferred embodiment of the present invention. Once the item 210 is dropped in the super atty field 217, the item 210 is automatically updated to reflect the new field changes.

To further elaborate, the process of editing an item in nested fields depends on where the user drags the item 210—that is, by dragging the item 210 into a main group, such as the due date field 215, or a sub-group, such as the super atty field 217. For example, if the user desires to change only one field of the item 210, such as the due date field 215, the user can drag the item 210 into only the due date field 215. As a result, the due date field of the item will change, but the supervising attorney field of the item will remain the same. However, if the user continues to drag the item 210 beyond the main group, the due date field 215, into the sub-group, the super atty field 217, both fields of the item will change as described in FIG. 16.

Consequently, in cases where sub-groups exist within sub-groups, each field of an item associated with a sub-grouped field will change as the user drags and drops the selected item into the sub-groups. Referring back to FIG. 15, for example, the subject field 204 is nested within the super atty field 202, which is nested within the due date field 200. If the user drags a selected item beyond the main group, due date field 200, and sub-group, super atty field 202, into the sub-group, subject field 204, which is a sub-group of the sub-group, super atty field 202, the due date field, the super atty field, and the subject field of the selected item will change.

Figure 17:
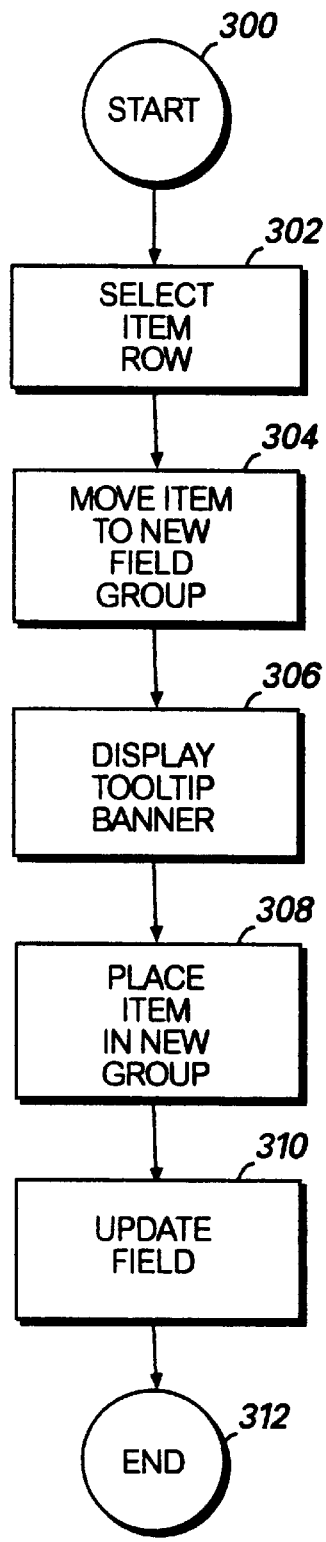
FIG. 17 is a flow diagram illustrating the steps that a user follows to directly edit an item on a display screen in accordance with the preferred embodiment of the present invention.

FIG. 17 is a flow diagram that illustrates the steps of the on-screen edit method of the present invention. The user begins at the START step 300 by turning on the computer 10 and selecting the preferred program module 37*a* for supporting the computer-implemented process for grouping items and on-screen editing.

In step 302, the user selects an item row for editing. After the selection is made, the user then moves the item to a new field group in step 304. As the user moves the item to a new field group, a tooltip banner appears in step 306. The tooltip banner is a feedback mechanism for displaying the results of placing an item in the new field group as the item moves to the new field group. The information displayed in the tooltip banner changes as the user moves the item to various fields on the display screen.

In step 308, the user places the item in the new field group of the user's choice. Once the item is placed in the new field group, the field is automatically updated and the item reflects the update in step 310. The editing process terminates at the END step 312.

Figure 18:
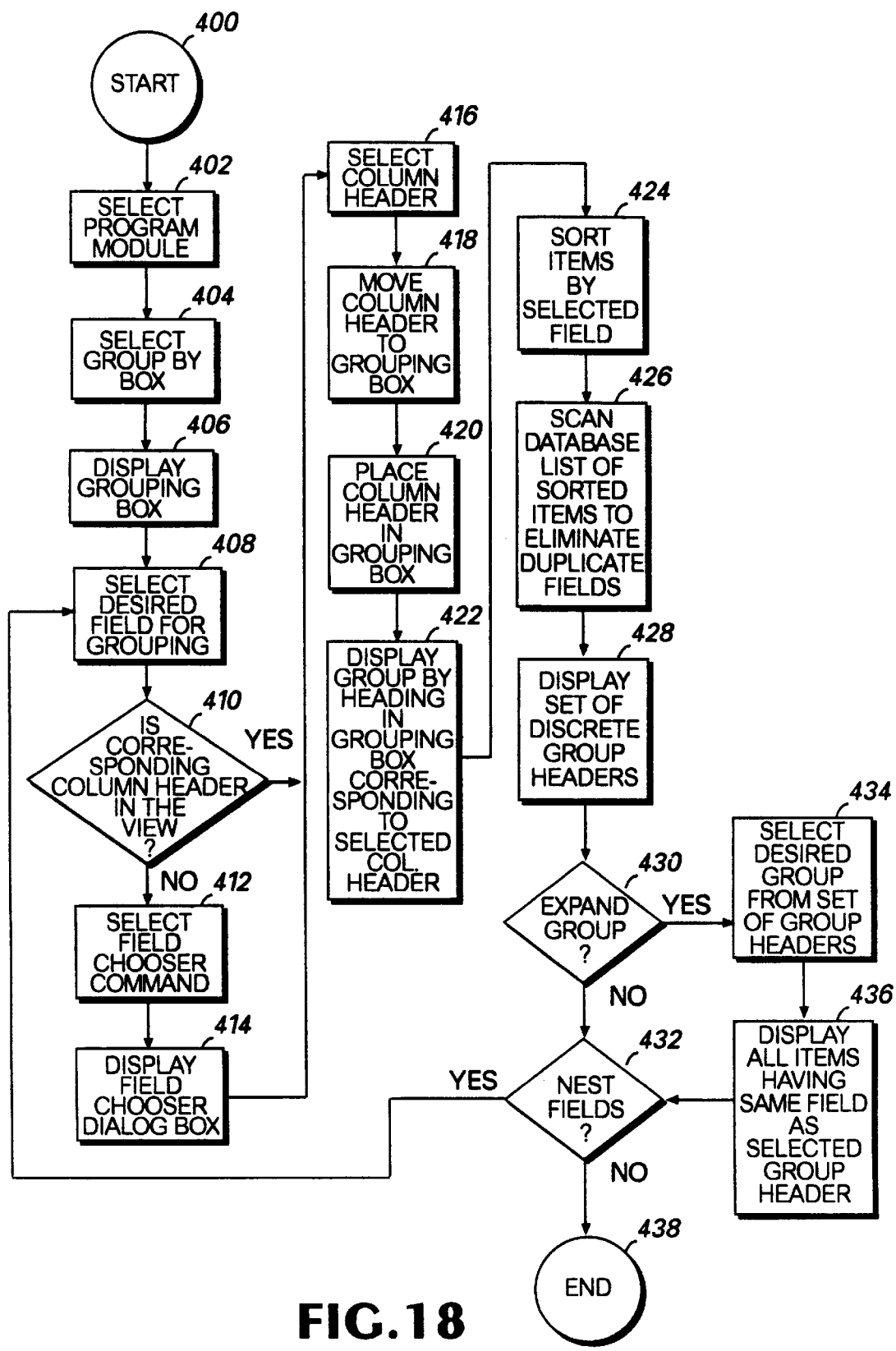
FIG. 18 is a flow diagram illustrating the steps for grouping items in response to user-provided input in accordance with the preferred embodiment of the present invention.

Referring to FIG. 18, the method by which the computer groups items using a grouping box will now be described. FIG. 18 is a flow diagram illustrating the steps for grouping items in response to user-provided input. At the START step 400, the computer parameters are initialized and the preferred application program 37*a* (FIG. 1) is selected. In step 402, the desired program module is selected, such as a personal information manager, which supports the "group by" feature of the present invention in response to user-provided input.

A Group By Box command is selected in step 404, in response to user-provided input. After the Group By Box command is selected, in step 406, a grouping box appears on the display screen. Next, a desired field for grouping items is selected in response to user-provided input in step 408. To select the desired field for grouping items, in step 410, a determination is made whether the column header that corresponds to the desired field is in the view. If the column header is in the view, the "YES" branch is followed to step 416; otherwise, the "NO" branch is followed to step 412. In step 416, the column header is selected in response to user-provided input. Next, the column header is moved to the grouping box in step 418. In step 420, the column header is placed in the grouping box and visual feedback (arrows) indicating that selection is displayed to the user. A group by heading is displayed in the grouping box, which corresponds to the selected column header in step 422. Once the group by heading is displayed in the grouping box, in step 424, items are sorted by the selected field. Next, the database list of sorted items is scanned to eliminate duplicate fields in step 426. In step 428, a set of discrete group headers is displayed.

After displaying the set of discrete group headers, an inquiry is conducted in step 430 to determine whether the user wants to expand the group to display the grouped items. If the user wants to display the grouped items, the "YES" branch is followed to step 434; otherwise, the "NO" branch is followed to step 432. In step 434, the desired group header for displaying items in the expanded view is selected. Next, the items within the selected group header are displayed.

Next, a determination is made whether the user wants to create sub-groups by nesting fields in step 432. In so, the "YES" branch is followed to step 408; otherwise, the "NO" branch is followed to step 438. If the "YES" branch is followed to step 408, steps 408–436 are repeated until additional sub-grouping is desired. The grouping process terminates for the selected field at the END step 438.

If at step 410 the column header is not in the view, the Field Chooser command is selected in step 412. In step 414, the Field Chooser dialog box, which contains a list of the remaining column headers, is displayed. Next, the column header is moved to the grouping box in step 418. In step 420, the column header is placed in the grouping box. A group by heading is displayed in the grouping box, which corresponds to the selected column header in step 422.

Once the group by heading is displayed in the grouping box, in step 424, items are sorted by the selected field. Next, the database list of sorted items is scanned to eliminate duplicate fields in step 426. In step 428, a set of discrete group headers is displayed.

After displaying the set of discrete group headers, an inquiry is conducted in step 430 to determine whether the user wants to expand the group to display the grouped items. If the user wants to display the grouped items, the "YES" branch is followed to step 434; otherwise, the "NO" branch is followed to step 432. In step 434, the desired group header for displaying items in the expanded view is selected. Next, the items within the selected group header are displayed.

Next, a determination is made whether the user wants to create sub-groups by nesting fields in step 432. If so, the "YES" branch is followed to step 408; otherwise, the "NO" branch is followed to step 438. If the "YES" branch is followed to step 408, steps 408–436 are repeated until additional sub-grouping is desired. The grouping process terminates for the selected field at the END step 438.

In summary, the present invention provides a method for directly manipulating items on a display screen into specified fields. Specifically, items can be grouped at multiple levels, ungrouped, and edited without accessing a specific dialog. Furthermore, fields are updated automatically as items are directly manipulated.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for editing grouped information comprising the steps of:

grouping a first group of information and a second group of information, each item of information of the first group and the second group comprising at least one field of information, wherein the items of information in the first and second groups are grouped by a first information field;

selecting an item from the first group;

moving the selected item proximate to the second group;

in response to moving the selected item proximate to the second group displaying a message indicating that the selected item's first information field will be modified if the selected item is added to the second group;

adding the selected item to the second group; and updating the first information field of the selected item within the second group to reflect that the selected item has been added to the second group.

2. A computer-readable medium on which is stored a program module for editing grouped information, the program module comprising instructions which, when executed by a computer, perform the steps of:

grouping a first group of information and a second group of information, each of the first group and the second group comprising at least one field of information, wherein the items of information in the first and second groups are grouped by a first information field;

selecting one of the items from the first group;

moving the selected item proximate to the second group;

in response to moving the selected item proximate to the second group, displaying a message indicating that the selected item's first information field will be modified if the selected item is added to the second group;

adding the selected item to the second group; and updating the first information field of the selected item within the second group to reflect that the selected item has been added to the second group.

3. The computer-readable medium of claim 2, wherein the first group and the second group belong to a main group of information, and the step of updating the status of the selected item comprises modifying the information associated with the selected item to be consistent with information items of the second group.

4. The computer-readable medium of claim 2, wherein the first group belongs to a main group of information and the second group of information belongs to a sub-group of information, and the items of information in the second group are further grouped by a second information field, and wherein the step of updating the status of the selected item comprises modifying the information associated with the first information field and the second information field to be consistent with the second group.

5. The computer-readable medium of claim 2 wherein the information items of the second group are arranged as a nested set of grouped information within the first group, and the step of updating the status of the selected item in the second group comprises modifying information associated with the first and second information fields for the selected item.

6. A method for editing grouped information comprising the steps of:

grouping a plurality of groups of information, such as a first group and second group, each of the plurality of groups comprising at least one field of information, wherein the items of information in the plurality of groups are grouped by a first information field;

selecting an item from the first group;

dragging the selected item proximate to the second group;

in response to dragging the selected item proximate to the second group, displaying a message indicating that the selected item's first information field will be modified if the selected item is added to the second group;

adding the selected item in the second group by deselecting the selected item proximate to the second group; and updating the first information field of the selected item within the second group to reflect that the selected item has been added to the second group.

* * * * *